(12) United States Patent
Gazalski

(10) Patent No.: US 8,127,487 B2
(45) Date of Patent: Mar. 6, 2012

(54) BIRD DECOY WITH RECESS FOR REMOVABLE STAKE

(75) Inventor: Richard S. Gazalski, Henryetta, OK (US)

(73) Assignee: G & H Decoy, Inc., Henryetta, OK (US)

( * ) Notice: Subject to any disclaimer, the term of this patent is extended or adjusted under 35 U.S.C. 154(b) by 0 days.

(21) Appl. No.: 13/047,028

(22) Filed: Mar. 14, 2011

(65) Prior Publication Data

US 2011/0239517 A1    Oct. 6, 2011

Related U.S. Application Data

(60) Provisional application No. 61/321,036, filed on Apr. 5, 2010.

(51) Int. Cl.
*A01M 31/06* (2006.01)
(52) U.S. Cl. .............................................................. 43/3
(58) Field of Classification Search ............... 43/3, 2
See application file for complete search history.

(56) References Cited

U.S. PATENT DOCUMENTS

| | | | |
|---|---|---|---|
| 843,588 A * | 2/1907 | Ditto | 43/3 |
| 1,066,587 A * | 7/1913 | Cunningham | 43/3 |
| 1,211,590 A | 1/1917 | Kennedy | |
| 1,316,566 A * | 9/1919 | Fauble | 43/3 |
| 1,452,631 A * | 4/1923 | Barker | 43/3 |
| 1,473,612 A * | 11/1923 | Dewey | 43/3 |
| 1,603,114 A * | 10/1926 | Johnson | 43/3 |
| 2,237,194 A * | 4/1941 | Ohnmacht | 43/3 |
| 2,268,963 A * | 1/1942 | Riddell | 43/3 |
| 2,483,680 A * | 10/1949 | Timm et al. | 43/3 |
| 2,622,360 A * | 12/1952 | Bertram | 43/3 |
| 2,639,534 A * | 5/1953 | Stossel | 43/3 |
| 2,736,120 A * | 2/1956 | Bruce | 43/3 |
| 2,763,952 A * | 9/1956 | Bruce | 43/3 |
| 2,787,074 A * | 4/1957 | Miller | 43/3 |
| 2,816,384 A * | 12/1957 | Rexius | 43/3 |
| 3,029,541 A * | 4/1962 | Palmer | 43/3 |
| 3,800,457 A * | 4/1974 | Barrett | 43/3 |
| 3,939,591 A * | 2/1976 | Schwartztrauber | 43/3 |
| D270,656 S * | 9/1983 | Fulster | D22/125 |
| 4,435,913 A * | 3/1984 | Messina | 43/3 |
| 4,658,530 A * | 4/1987 | Ladehoff | 43/3 |
| 4,757,630 A * | 7/1988 | Torberg | 43/3 |
| 4,885,861 A * | 12/1989 | Gazalski | 43/3 |
| 5,098,050 A * | 3/1992 | Bruns et al. | 43/3 |
| 5,168,649 A * | 12/1992 | Wright | 43/3 |
| 5,189,823 A * | 3/1993 | Lanius | 43/3 |
| 5,199,204 A * | 4/1993 | Lowery | 43/3 |
| 5,205,060 A * | 4/1993 | Franceschini | 43/3 |
| 5,392,554 A * | 2/1995 | Farstad et al. | 43/3 |

(Continued)

*Primary Examiner* — Darren W Ark
(74) *Attorney, Agent, or Firm* — Sughrue Mion, PLLC

(57) ABSTRACT

A first aspect of the invention is a bird decoy, including a body; a weighted keel; a sleeve, wherein the sleeve includes a slot that fits over the keel; and a stake, wherein the stake is inserted in the sleeve. A second aspect of the invention is a bird decoy, including a body; a weighted keel; a stake, wherein the stake is inserted in the keel; wherein the keel includes a recess with a web and the stake includes a slot, wherein the web is inserted in the slot of the stake. A third aspect of the invention is a bird decoy, including a body; and a stake, wherein the stake is inserted in the body; wherein the body includes a recess with a web and the stake includes a slot, wherein the web is inserted in the slot of the stake.

6 Claims, 6 Drawing Sheets

U.S. PATENT DOCUMENTS

| | | | |
|---|---|---|---|
| D365,136 S * | 12/1995 | Shaver et al. | D22/125 |
| 5,832,650 A * | 11/1998 | Franceschini | 43/3 |
| 6,336,286 B1 * | 1/2002 | Liechty, II | 43/3 |
| 6,339,895 B1 * | 1/2002 | Lawson | 43/3 |
| 6,442,884 B1 * | 9/2002 | Sceery | 43/3 |
| 6,470,621 B2 * | 10/2002 | Murray et al. | 43/3 |
| 6,622,417 B2 * | 9/2003 | Liechty, II | 43/3 |
| 6,748,690 B2 * | 6/2004 | Igo | 43/3 |
| 7,409,793 B1 * | 8/2008 | Schwarz | 43/3 |
| 7,421,819 B2 * | 9/2008 | Zink, Jr. | 43/3 |
| 7,568,305 B2 * | 8/2009 | Fanfelle | 43/3 |
| 2003/0192226 A1 * | 10/2003 | Cain | 43/3 |
| 2005/0252067 A1 * | 11/2005 | Wade | 43/3 |
| 2005/0268522 A1 * | 12/2005 | Foster et al. | 43/3 |
| 2007/0180753 A1 * | 8/2007 | Zink et al. | 43/3 |
| 2009/0126253 A1 * | 5/2009 | Wood et al. | 43/3 |

\* cited by examiner

US 8,127,487 B2

BIRD DECOY WITH RECESS FOR REMOVABLE STAKE

CROSS-REFERENCE TO RELATED APPLICATIONS

This application claims priority from U.S. Provisional Application No. 61/321,036, which was filed on Apr. 5, 2010. The entire content of the prior-filed application is incorporated by reference.

FIELD OF THE INVENTION

This invention generally relates to bird decoys.

BACKGROUND OF THE INVENTION

Waterfowl hunting with decoys, e.g., for ducks and geese, requires a considerable investment in decoys, which are set out or spread to simulate natural birds. Most decoys are made for use floating in water or secured to land or ice. It is an objective of the present invention to provide bird decoy that can be easily and effectively used in water and secured to land or ice.

SUMMARY OF THE INVENTION

A first aspect of the invention is a bird decoy, including a body; a weighted keel; a sleeve, wherein the sleeve includes a slot that fits over the keel; and a stake, wherein the stake is inserted in the sleeve.

A second aspect of the invention is a bird decoy, including a body; a weighted keel; a stake, wherein the stake is inserted in the keel; wherein the keel includes a recess with a web and the stake includes a slot, wherein the web is inserted in the slot of the stake.

A third aspect of the invention is a bird decoy, including a body; and a stake, wherein the stake is inserted in the body; wherein the body includes a recess with a web and the stake includes a slot, wherein the web is inserted in the slot of the stake.

DETAILED DESCRIPTION OF THE EXEMPLARY EMBODIMENTS

Figure 1:
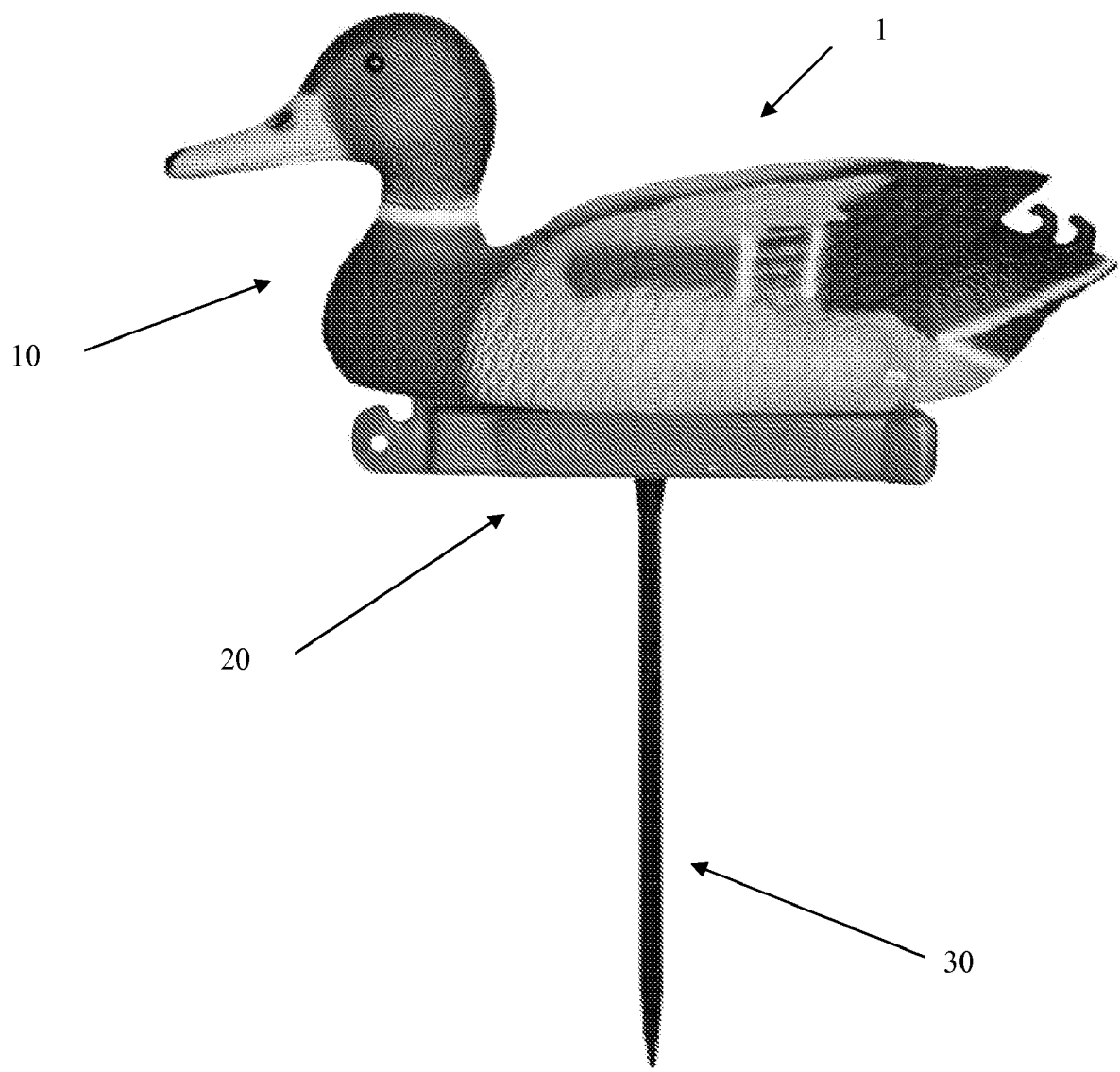
FIG. 1 is shows a first exemplary embodiment of a floating waterfowl decoy with a removable stake.

The exemplary embodiments of the invention allow conversion of floating decoys for field use, or use on ice. Referring to FIG. 1, a waterfowl decoy 1 of the first embodiment is provided with a decoy body 10 and a weighted keel 20, which can be filled with sand or some other material to provide a counterbalance. A stake 30 is removably attached to the keel 20. Of course, the invention is not limited to attachment to a keel. The stake 30 can be attached to the underside of the decoy's body or any structure provided at the underside of the decoy 1. The stake 30 can be inserted into a socket or recess 22 in the keel 20, underside of the decoy 1, or other structure, thus, holding the decoy 1 above the ground, ice or shallow water. This simulates a duck standing in the field. And, by removing the stake 30, the decoy 1 can be returned again to use in the water.

Figure 2A:
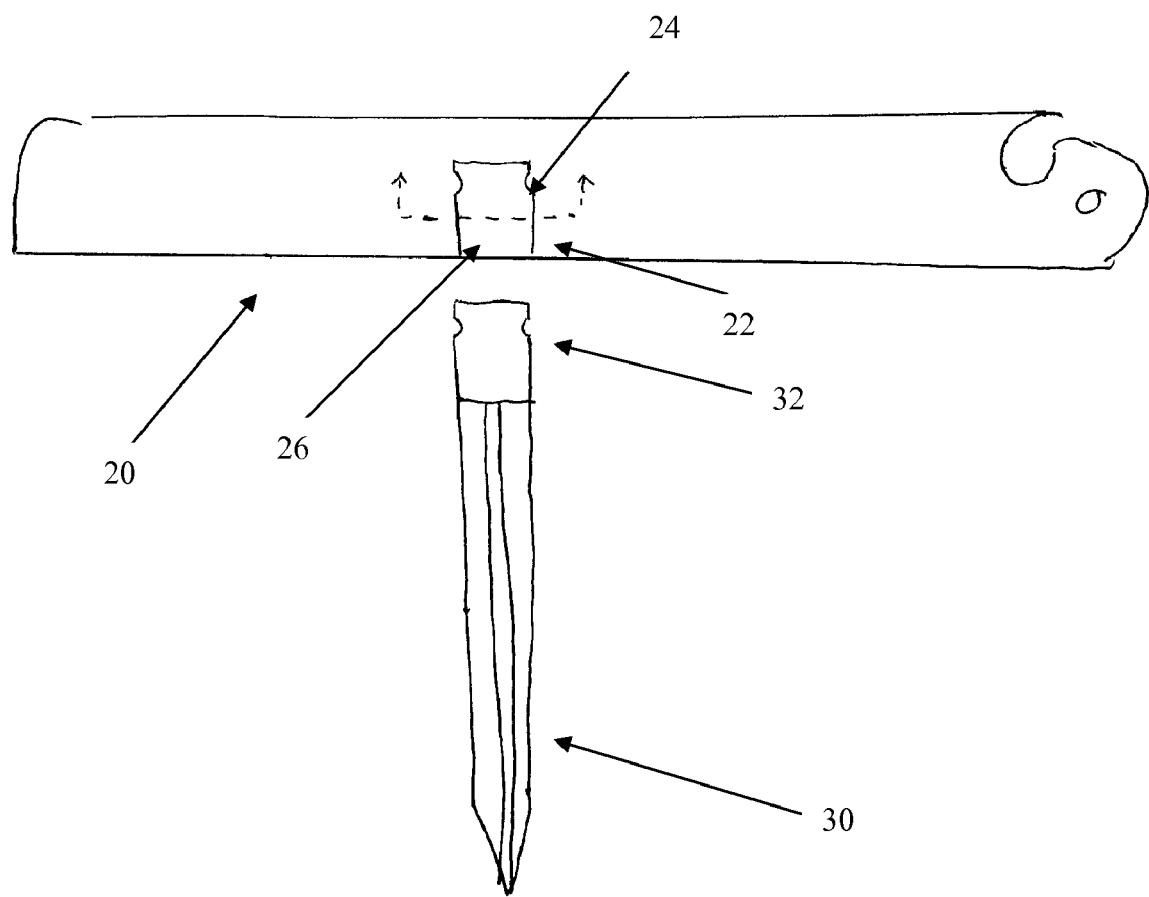
FIGS. 2A, 2B, 2C, and 3 show the recess and stake of the first exemplary embodiment.
Figure 2B:
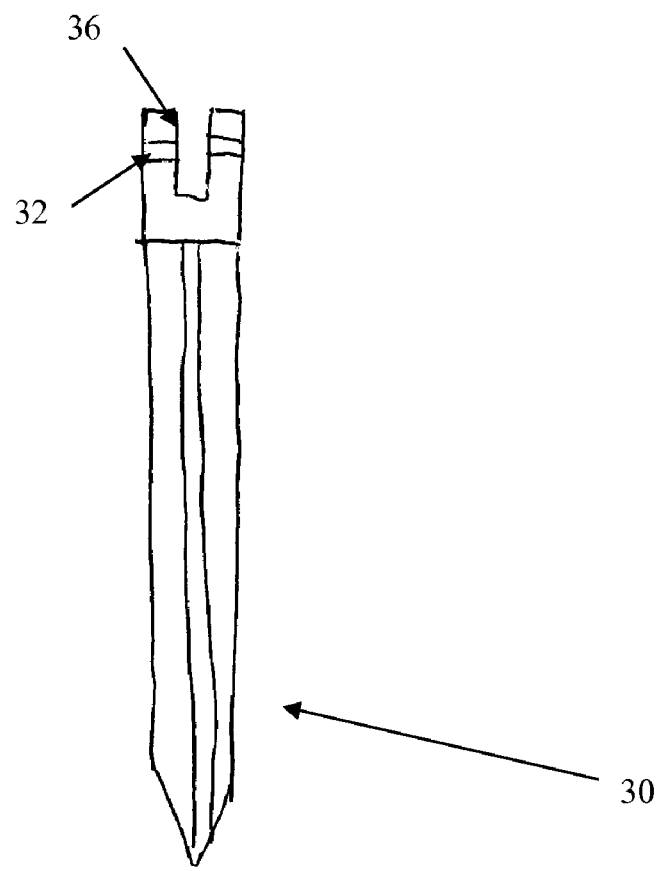
Figure 2C:
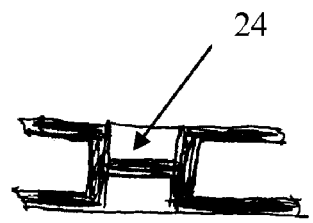
Figure 3:
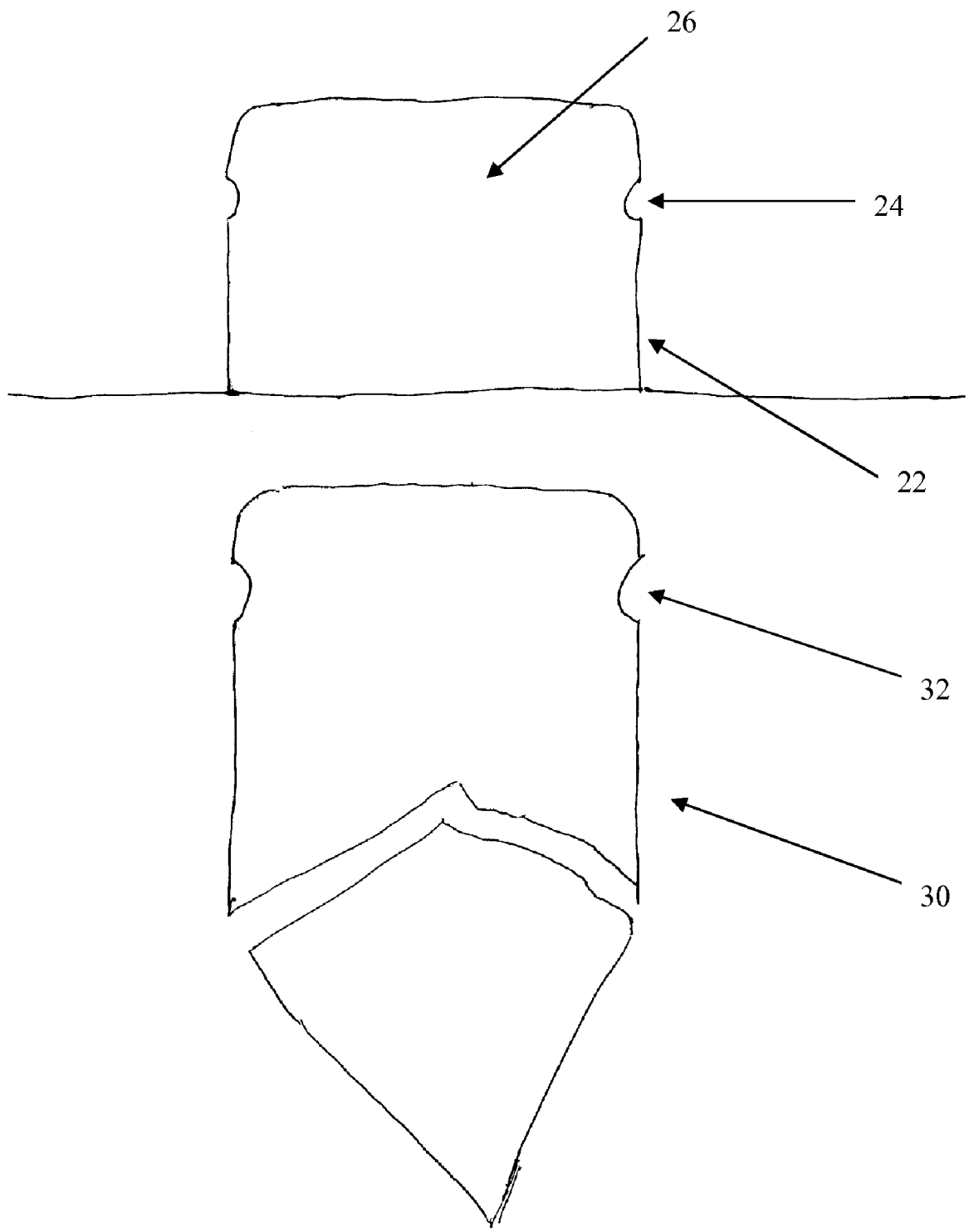

As shown in FIGS. 2A and 3, in the first embodiment, the recess 22 includes bump locks 24 is provided at a bottom of the keel 20. FIG. 2A shows the first embodiment, FIG. 2B shows a side view of the stake 30, and FIG. 2C is a 2C-2C cross-section of the recess 22 shown in FIG. 2A. FIG. 3 shows details of the recess 22 and the top of the sake 30.

As shown in these figures, the recess 22 includes a web member 26 within the recess 22. As also shown in these figures, the stake 30 includes small slots 32 for engaging the bumps 24 and a larger slot 36 for engaging the web member 26. The recess 22 and other structures can be formed by injection molding or in another manner. These structures provide a secure fit that prevents the decoy and stake from being separated.

Exemplary dimensions of the embodiment are as follows. The recess 22 is ¾ inches across and 9/16 inches deep. The interior corners of the recess 22 have a radius of curvature of 1/16 inches. The centers of the bumps 24 are provided 3/16 inches below the interior surface of the recess 22; the bumps 24 have each have a radius of curvature of 1/16 inches. The top of the stake 30, like the recess 22, is 9/16 inches. Like the bumps 24, recesses 34 at sides of the stake 30 have a radius of curvature of 1/16 inches and the centers of the recesses 34 are provided 3/16 inches below the top surface of the stake 30. In this embodiment, the depth of the recesses 34 and the height of the bumps 24 are 0.020 inches.

Figure 4:
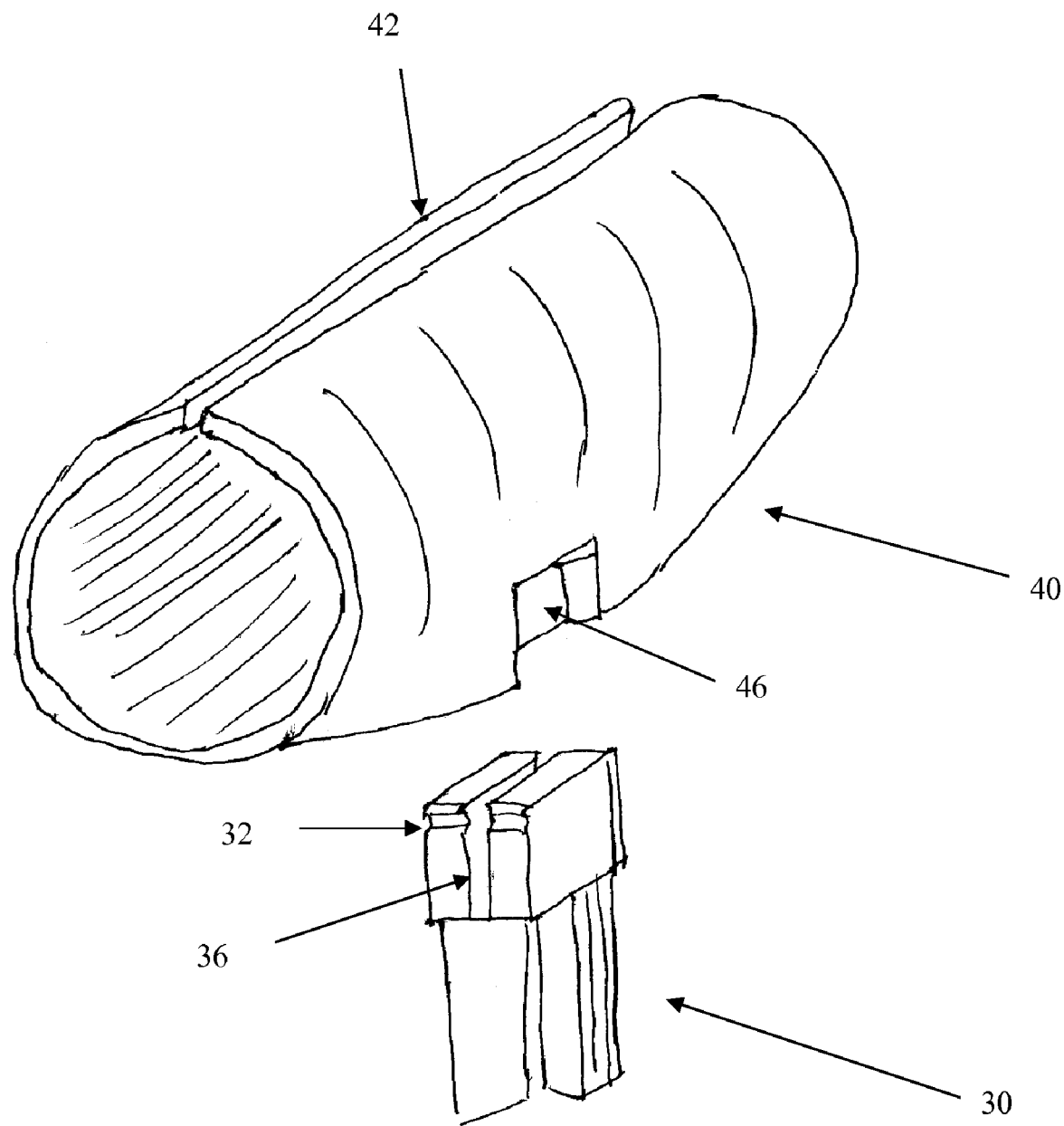
FIG. 4 shows a second exemplary embodiment.

FIG. 4 shows a second embodiment in which the recess 22 is provided in a sleeve 40 that is attached to decoy 1. The sleeve 40 includes a slot 42 that fits over the keel 20 provided under the decoy's body 10. In this embodiment, the sleeve 40 has a substantially cylindrical shape. The recess, web portion 46, and bump locks (not shown) are provided in the sleeve 40 in the same manner that these features are provided in the keel 20 of the first embodiment.

Figure 5:
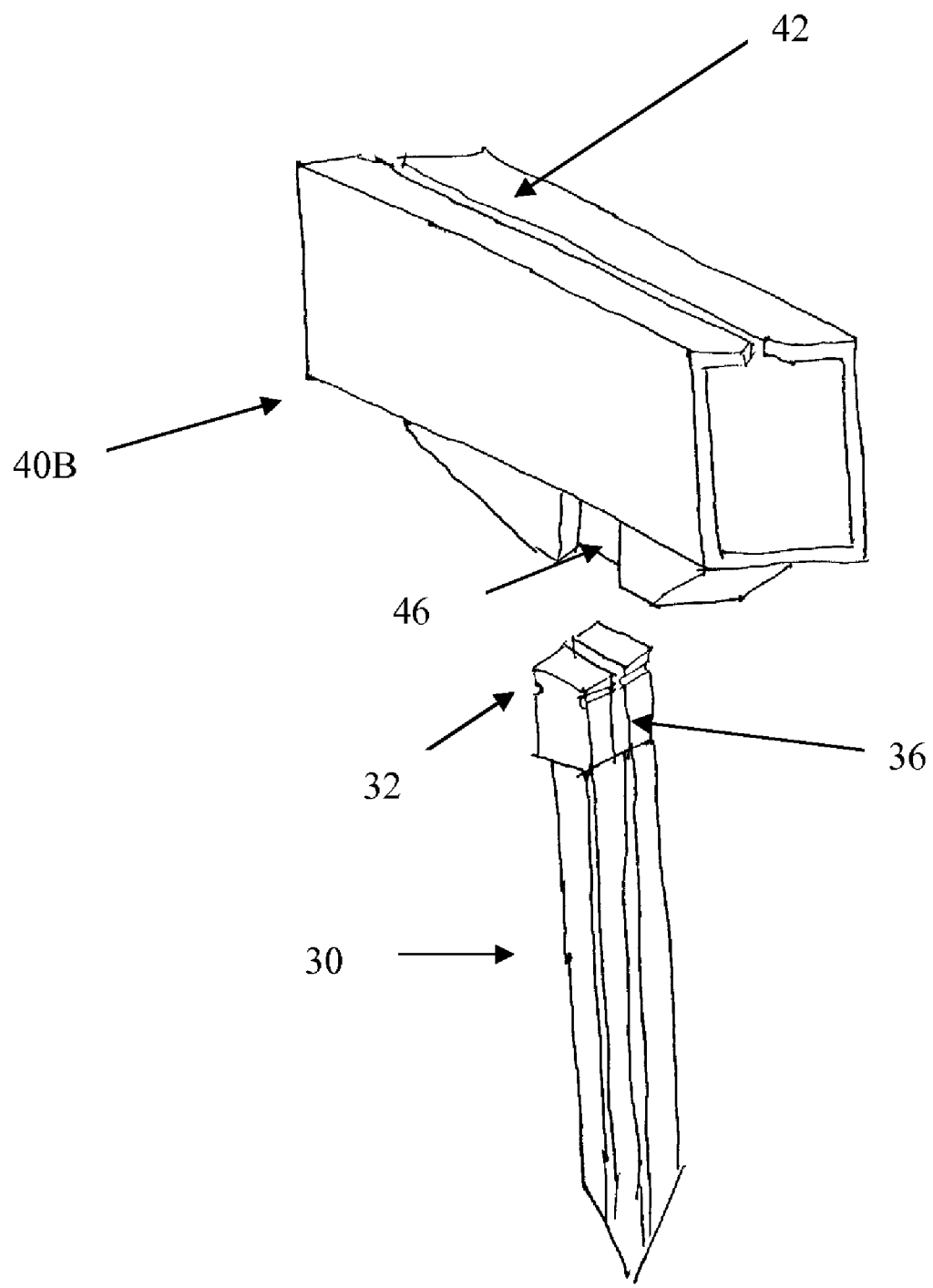
FIG. 5 shows a third exemplary embodiment.

FIG. 5 shows a third embodiment which is similar to the second embodiment except that the sleeve 40A is rectangular or square.

The invention has been described and illustrated several exemplary embodiments, i.e. use with a waterfowl decoy. It will be appreciated, however, that the invention can be applied to other bird decoys, such as an animated bird decoy that moves by wind or a mechanical device, and that the dimensions, materials and other variables may be altered to suit individual design considerations without departing from the spirit and scope of the present invention.

What is claimed is:

1. A bird decoy, comprising:
a bird decoy structure; and
a stake, wherein
the stake is inserted in the bird decoy structure;
the bird decoy structure includes a recess comprising
an upper surface,
first and second side surfaces,
a web protruding downward from the upper surface and extending between the first side surface and the second side surface;
a first bump extending from the first side surface at a first side of the web; and
a second bump extending from the first side surface at an opposing second side of the web;
the stake includes a main slot separating a distal end of the stake into a first protrusion and a second protrusion, each of the first protrusion and the second protrusion including a first side surface that is provided adjacent to the first side surface of the recess when the web is inserted into the main slot;

wherein the web is inserted in the main slot of the stake;

a first slot provided on the first side surface of the first protrusion engages the first bump, and a second slot provided on the first side surface of the second protrusion engages the second bump.

2. The bird decoy according to claim 1, wherein the bird decoy structure includes a body and a weighted keel, and the keel includes the recess.

3. The bird decoy according to claim 1,
wherein the bird decoy structure includes a body, a weighted keel, and a sleeve that includes a keel slot that fits over the keel, and
wherein the sleeve includes the recess.

4. The bird decoy according to claim 3, wherein the sleeve has a substantially cylindrical shape.

5. The bird decoy according to claim 3, wherein the sleeve has a substantially rectangular or square shape.

6. The bird decoy according to claim 3, further comprising:
a third bump extending from the second side surface of the recess at the first side of the web;
a fourth bump extending from the second side surface of the recess at the second side of the web;
each of the first protrusion and the second protrusion including a second side surface that is provided adjacent to the second side surface of the recess when the web is inserted into the main slot;
a third slot provided on the second side surface of the first protrusion engages the third bump; and
a fourth slot provided on the second side surface of the second protrusion engages the fourth bump.

* * * * *